United States Patent
Wang

(10) Patent No.: US 10,261,975 B2
(45) Date of Patent: Apr. 16, 2019

(54) FOUR-DIMENSIONAL NON-EQUILIBRIUM HYPERCHAOTIC SYSTEM AND ANALOG CIRCUIT, BASED ON FIVE SIMPLEST CHAOTIC SYSTEMS

(71) Applicant: Zhonglin Wang, Binzhou (CN)

(72) Inventor: Zhonglin Wang, Binzhou (CN)

(73) Assignees: Binzhou University, Shandong (CN); Zhonglin Wang, Shandong (CN)

( * ) Notice: Subject to any disclaimer, the term of this patent is extended or adjusted under 35 U.S.C. 154(b) by 123 days.

(21) Appl. No.: 15/445,960

(22) Filed: Feb. 28, 2017

(65) Prior Publication Data

US 2017/0168987 A1    Jun. 15, 2017

Related U.S. Application Data

(63) Continuation of application No. PCT/CN2015/000261, filed on Apr. 14, 2015.

(30) Foreign Application Priority Data

Aug. 31, 2014    (CN) .......................... 2014 1 0438026

(51) Int. Cl.
*G06F 17/13*    (2006.01)
*H04L 9/00*    (2006.01)

(52) U.S. Cl.
CPC ................ *G06F 17/13* (2013.01); *H04L 9/00* (2013.01); *H04L 9/001* (2013.01)

(58) Field of Classification Search
CPC ............ G06F 17/13; H04L 9/00; H04L 9/001
USPC ........................................................ 708/190
See application file for complete search history.

(56) References Cited

FOREIGN PATENT DOCUMENTS

| CN | 102904709 A | 1/2013 |
|---|---|---|
| CN | 102970128 A | 3/2013 |
| CN | 103684746 A | 3/2014 |
| CN | 103684747 | 3/2014 |

(Continued)

*Primary Examiner* — Tan V Mai
(74) *Attorney, Agent, or Firm* — Wayne & Ken, LLC; Tony Hom

(57) ABSTRACT

Provided are a four-dimensional non-equilibrium hyperchaotic system and analog circuit, based on the five simplest three-dimensional chaotic systems; an operational amplifier (U1), an operational amplifier (U2), and resistor and capacitor are used to constitute an inverting adder and an inverting integrator; multipliers (U3) and (U4) are used to perform multiplication operations; an 8V DC power supply is used for constant input; the operational amplifier (U1) and operational amplifier (U2) use LF347N, and the multipliers (U3) and (U4) use AD633JN; the operational amplifier (U1) is connected to the operational amplifier (U2) and the multiplier (U3); the operational amplifier (U2) is connected to the multiplier (U4), the DC power supply, and the operational amplifier (U1); the multiplier (U3) is connected to the operational amplifier (U1); the multiplier (U4) is connected to the operational amplifier (U2); the DC power supply is connected to the operational amplifier (U2); on the basis of the five simplest three-dimensional chaotic systems, a non-equilibrium four-dimensional hyperchaotic system is provided and an analog circuit is used for the implementation of same, thus a new method and idea is provided for the applications of chaotic systems to engineering fields such as communications.

1 Claim, 3 Drawing Sheets

(56) References Cited

FOREIGN PATENT DOCUMENTS

| | | |
|---|---|---|
| CN | 103731256 A | 4/2014 |
| CN | 104202143 A | 12/2014 |

FOUR-DIMENSIONAL NON-EQUILIBRIUM HYPERCHAOTIC SYSTEM AND ANALOG CIRCUIT, BASED ON FIVE SIMPLEST CHAOTIC SYSTEMS

CROSS-REFERENCE TO RELATED APPLICATIONS

This application is a continuation of International Patent Application No. PCT/CN2015/000261 with a filing date of Apr. 14, 2015, designating the United States, now pending, and further claims priority to Chinese Patent Application No. 201410438026.4 with a filing date of Aug. 31, 2014. The content of the aforementioned application, including any intervening amendments thereto, are incorporated herein by reference.

TECHNICAL FIELD

The present invention relates to a chaotic system and an analog circuit, and in particular relates to a four-dimensional non-equilibrium hyperchaotic system based on five simplest chaotic systems and an analog circuit.

BACKGROUND

At present, the existing hyperchaotic system generally adds one dimension based on a three-dimen.sional chaotic system with three equilibriums, so as to form a four-dimensional hyperchaotic system with at least one equilibrium, and a four-dimensional non-equilibrium hyperchaotic system is not proposed. The present invention proposes a four-dimensional non-equilibrium hyperchaotic system based on five simplest three-dimensional chaotic systems, is realized by an analog circuit and provides a novel method and idea of applications of the chaotic systems in engineering fields such as communication and the like.

SUMMARY

The purpose of he present invention is to provide a non-equilibrium hyperchaotic system based on five simplest chaotic systems and an analog circuit, and is realized by the following technical means:

1. the four-dimensional non-equilibrium hyperchaotic system based on the five simplest systems is characterized by comprising the following steps:

(1) The five simplest three-dimensional chaotic systems i are:

$$\begin{cases} dx/dt = a(y-x) \\ dy/dt = -xz \\ dz/dt = -b + xy \end{cases} \quad a=5, b=90; \quad \text{i}$$

(2) Based on the three-dimensional chaotic systems i, a differential equation $dw/dt = -ky$ is added, and w is fed back to a second equation of the systems i, so as to obtain a chaotic system ii below:

$$\begin{cases} dx/dt = a(y-x) \\ dy/dt = w - xz \\ dz/dt = -b + xy \\ dw/dt = -ky \end{cases} \quad a=10, b=80, k=10; \quad \text{ii}$$

(3) An analog circuit system is formed according to the non-equilibrium hyperchaotic system ii; an inverting adder and an inverting integrator are formed by an operational amplifier U1, an operational amplifier U2, resistors and capacitors; multipliers U3 and U4 are used for realizing multiplication operations; 8V DC (Direct Current) power supply is used for realizing constant input; LF347N is adopted as the operational amplifier U1 and the operational amplifier U2; and AD633JN is adopted as the multipliers U3 and U4;

The operational amplifier U1 is connected with the operational amplifier U2 and the multiplier U3; the operational amplifier U2 is connected with the multiplier U4, the DC power supply and the operational amplifier U1; the multiplier U3 is connected with the operational amplifier U1: the multiplier U4 is connected with the operational amplifier U2; and the 8V DC power supply is connected with the operational amplifier U2;

A pin 1 of the operational amplifier U1 is connected with a pin 2 of the operational amplifier U1 by a resistor R6 and is connected with a pin 6 of the operational amplifier U1 by a resistor R7; a pin 3, a pin 5, a pin 10 and a pin 12 of the operational amplifier U1 are grounded; a pin 4 of the operational amplifier U1 is connected with VCC; a pin 11 of the operational amplifier U1 is connected with VEE; the pin 6 of the operational amplifier U1 is connected with a pin 7 of the operational amplifier U1 by a capacitor C2; the pin 7 of the operational amplifier U1 outputs y, is connected with a pin 13 of the operational amplifier U1 by a resistor R1 is connected with a pin 6 of the operational amplifier U2 by a resistor R13 and is connected with a pin 3 of the multiplier U4; a pin 8 of the operational amplifier U1 outputs x, is connected with a pin 9 of the operational amplifier U1 by a capacitor C1, is connected with a pin 1 of the multiplier U3, is connected with a pin 1 of the multiplier U4 and is connected with the pin 9 of the operational amplifier U1 by a resistor R4; a pin 13 of the operational amplifier U1 is connected with a pin 14 of the operational amplifier U1 by a resistor R2; and the pin 14 of the operational amplifier U1 is connected with the pin 9 of the operational amplifier U1 by a resistor R3;

A pin 1 and a pin 2 of the operational amplifier U2 are hung in the air; a pin 3, a pin 5, a pin 10 and a pin 12 of the operational amplifier U2 are grounded; a pin 4 of the operational amplifier U2 is connected with VCC; a pin 11 is connected with VEE; the pin 6 of the operational amplifier U2 is connected with a pin 7 of the operational amplifier U2 by a capacitor C4; the pin 7 of the operational amplifier U2 outputs w and is connected with the pin 2 of the operational amplifier U1 by a resistor R5; a pin 8 of the operational amplifier U2 outputs z and is connected with a pin 3 of the multiplier U3; a pin 9 of the operational amplifier U2 is connected with the pin 8 of the operational amplifier U2 by a capacitor C3 and is grounded after being connected with the 8V DC power supply by a resistor R12; a pin 13 of the operational amplifier U2 is connected with a pin 14 of the operational amplifier U2 by a resistor R10; and the pin 14 of the operational amplifier U2 is connected with the pin 9 of the operational amplifier U2 by a resistor R11;

The pin 1 of the multiplier U3 is connected with the pin 8 of the operational amplifier U1; the pin 3 of the multiplier U3 is connected with the pin 8 of the operational amplifier U2; a pin 2, a pin 4 and a pin 6 of the multiplier U3 are grounded; a pin 5 of the multiplier U3 is connected with VEE; a pin 7 of the multiplier U3 is connected with the pin 6 of the operational amplifier U1 by a resistor RB; and a pin 8 of the multiplier U3 is connected with VCC;

The pin 1 of the multiplier U4 is connected with the pin 8 of the operational amplifier U1; the pin 3 of the multiplier U4 is connected with the pin 7 of the operational amplifier U1; a pin 2, a pin 4 and a pin 6 of the multiplier U4 are grounded; a pin 5 of the multiplier U4 is connected with VEE: a pin 7 of the multiplier U4 is connected with the pin 13 of the operational amplifier U2 by a resistor R9: and a pin 8 of the multiplier U4 is connected with VCC;

2. The analog circuit of the four-dimensional non-equilibrium hyperchaotic system based on the five simplest systems is characterized by consisting of the operational amplifier U1, the operational amplifier U2, the multiplier U3, the multiplier U4 and the 8V DC power supply;

The operational amplifier U1 is connected with the operational amplifier U2 and the multiplier U3; the operational amplifier U2 is connected with the multiplier U4, the DC power supply and the operational amplifier U1; the multiplier U3 is connected with the operational amplifier U1; the multiplier U4 is connected with the operational amplifier U2; the 8V DC power supply is connected with the operational amplifier U2; LF347N is adopted as the operational amplifier U1 and the operational amplifier U2; and AD633JN is adopted as the multipliers U3 and U4;

The pin 1 of the operational amplifier U1 is connected with the pin 2 of the operational amplifier U1 by the resistor R6 and is connected with the pin 6 of the operational amplifier U1 by the resistor R7; the pin 3, the pin 5, the pin 10 and the pin 12 of the operational amplifier U1 are grounded; the pin 4 of the operational amplifier U1 is connected with VCC; the pin 11 of the operational amplifier U1 is connected with VEE; the pin 6 of the operational amplifier U1 is connected with the pin 7 of the operational amplifier U1 by the capacitor C2; the pin 7 of the operational amplifier U1 outputs y, is connected with the pin 13 of the operational amplifier U1 by the resistor R1, is connected with the pin 6 of the operational amplifier U2 by the resistor R13 and is connected with the pin of the multiplier U4; the pin 8 of the operational amplifier U1 outputs x, is connected with the pin 9 of the operational amplifier U1 by the capacitor C1, is connected with the pin 1 of the multiplier U3, is connected with the pin 1 of the multiplier U4 and is connected with the, pin 9 of the operational amplifier U1 by the resistor R4; the pin 13 of the operational amplifier U1 is connected with the pin 14 of the operational amplifier U1 by the resistor R2; and the pin 14 of the operational amplifier U1 is connected with the pin 9 of the operational amplifier U1 by the resistor R3;

The pin 1 and the pin 2 of the operational amplifier U2 are hung in the air; the pin 3, the pin 5, the pin 10 and the pin 12 of the operational amplifier U2 are grounded; the pin 4 of the operational amplifier U2 is connected with VCC; the pin 11 is connected with VEE; the pin 6 of the operational amplifier U2 is connected with the pin 7 of the operational amplifier U2 by the capacitor C4; the pin 7 of the operational amplifier U2 outputs w and is connected with the pin 2 of the operational amplifier U1 by the resistor R5; the pin 8 of the operational amplifier U2 outputs z and is connected with the pin 3 of the multiplier U3; the pin 9 of the operational amplifier U2 is connected with the pin 8 of the operational amplifier U2 by the capacitor C3 and is grounded after being connected with the 8V DC power supply by the resistor R12; the pin 13 of the operational amplifier U2 is connected with the pin 14 of the operational amplifier U2 by the resistor R10; and the pin 14 of the operational amplifier U2 is connected with the pin 9 of the operational amplifier U2 by the resistor R11;

The pin 1 of the multiplier U3 is connected with the pin 8 Of the operational amplifier U1; the pin 3 of the multiplier U3 is connected with the pin 8 of the operational amplifier U2; the pin 2, the pin 4 and the pin 6 of the multiplier U3 are grounded; the pin 5 of the multiplier U3 is connected with VEE; the pin 7 of the multiplier U3 is connected with the pin 6 of the operational amplifier U1 by the resistor R8; and the pin 8 of the multiplier U3 is connected with VCC;

The pin 1 of the multiplier U4 is connected with the pin 8 of the operational amplifier U1; the pin 3 of the multiplier U4 is connected with the pin 7 of the operational amplifier U1; the pin 2, the pin 4 and the pin 6 of the multiplier U4 are grounded; the pin 5 of the multiplier U4 is connected with VEE, the pin 7 of the multiplier U4 is connected with the pin 13 of the operational amplifier U2 by the resistor R9; and the pin 8 of the multiplier U4 is connected with VCC.

Beneficial Effects

The present invention has the beneficial effects that: based on the five simplest three-dimensional chaotic systems, the four-dimensional non-equilibrium hyperchaotic system is proposed, is realized by the analog circuit and provides the novel method and idea of the applications of the chaotic systems in the engineering fields such as communication and the like,

DETAILED DESCRIPTION

Figure 1:
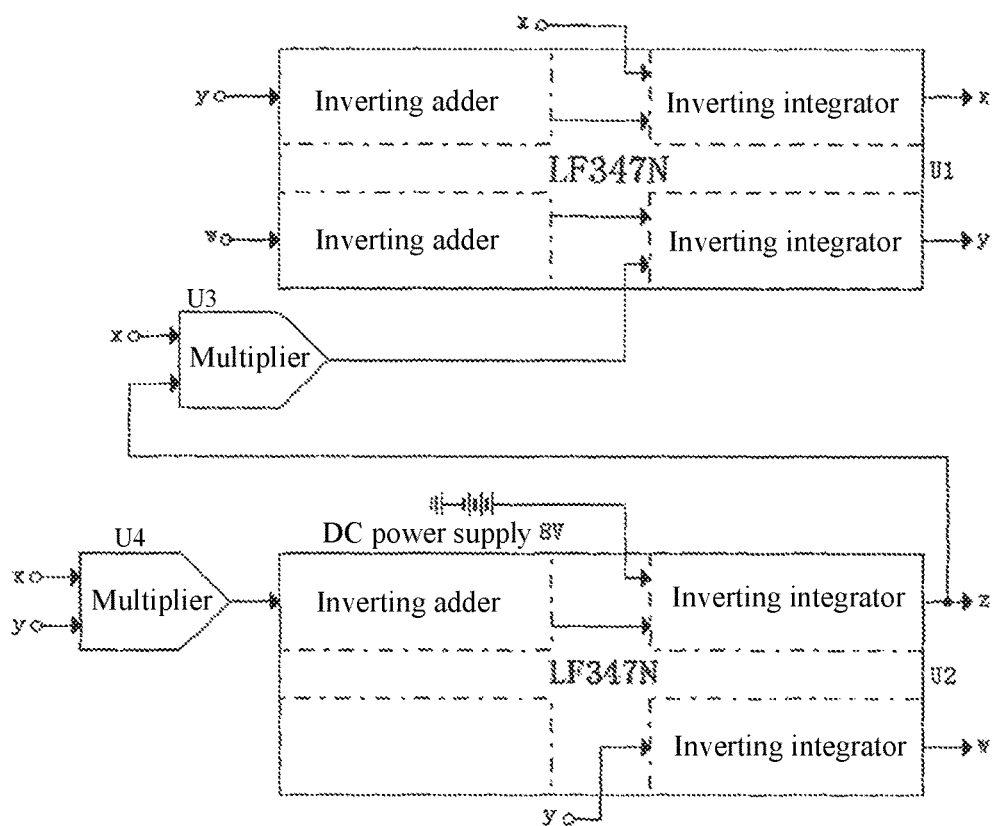
FIG. 1 is a structural schematic diagram of connection of circuits of a preferential embodiment of the present invention.
Figure 2:
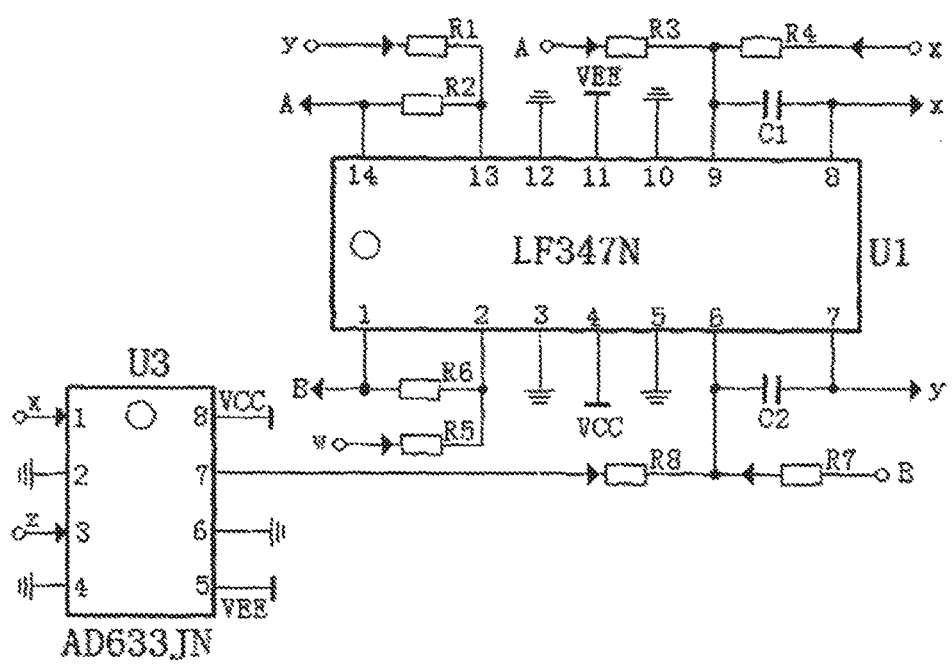
FIG. 2 and FIG. 3 are diagrams of actual connection of circuits of the present invention.
Figure 3:
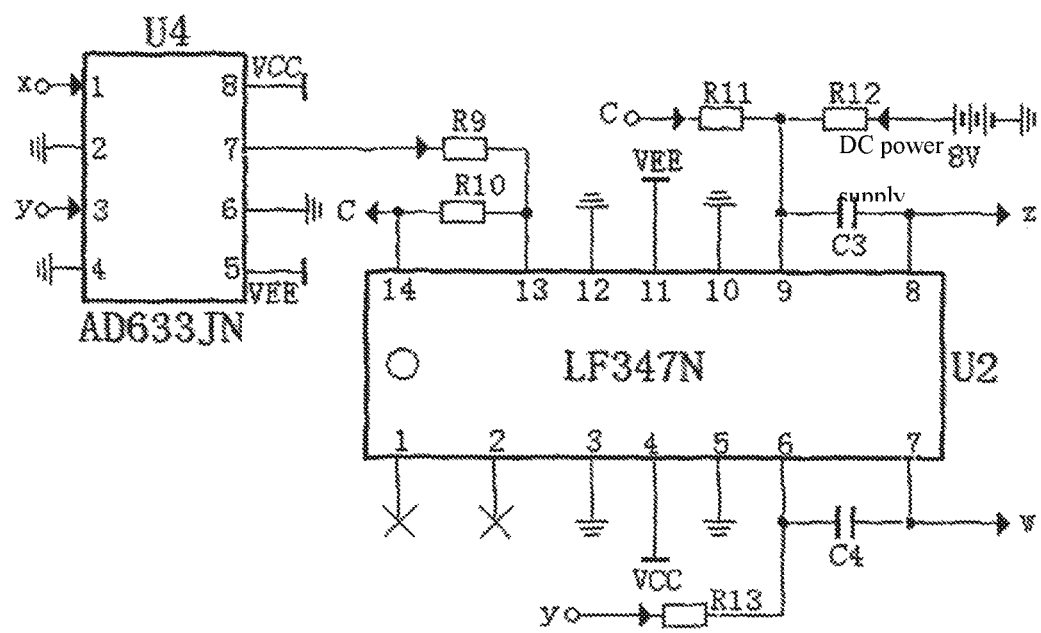

As shown in FIGS. 1-3, the present invention is further described below in detail in combination with the drawings and a preferential embodiment.

The four-dimensional non-equilibrium hyperchaotic system based on the five simplest systems is characterized by comprising the following steps:

(1) The five simplest three-dimensional chaotic systems i are:

$$\begin{cases} dx/dt = a(y-x) \\ dy/dt = -xz \\ dz/dt = -b + xy \end{cases} \quad a = 5, b = 90; \qquad \text{i}$$

(2) Based on the three-dimensional chaotic systems i, a differential equation dw/dt=−ky is added, and w is fed back to a second equation of the systems i, so as to obtain a chaotic system ii below)

$$\begin{cases} dx/dt = a(y-x) \\ dy/dt = w - xz \\ dz/dt = -b + xy \\ dw/dt = -ky \end{cases} \quad a = 10, b = 80, k = 10; \qquad \text{ii}$$

(3) An analog circuit system is formed according to the non-equilibrium hyperchaotic system ii; an inverting adder and an inverting integrator are formed by an operational amplifier U1, an operational amplifier U2, resistors and capacitors; multipliers U3 and U4 are used for realizing multiplication operations; a 8V DC (Direct Current) power supply is used for realizing constant input; LF347N is adopted as the operational amplifier U1 and the operational amplifier U2; and AD633JN is adopted as the multipliers U3 and U4;

The operational amplifier U1 is connected with the operational amplifier U2 and the multiplier U3; the operational amplifier U2 is connected with the multiplier U4, the DC power supply and the operational amplifier U1; the multiplier U3 is connected with the operational amplifier U1; the multiplier U4 is connected with the operational amplifier U2 and the 8V DC power supply is connected with the operational amplifier U2;

A pin 1 of the operational amplifier U1 is connected, with a pin 2 of the operational amplifier U1 by a resistor R6 and is connected with a pin 6 of the operational amplifier U1 by a resistor R7; a pin 3, a pin 5, a pin 10 and a pin 12 of the operational amplifier U1 are grounded; a pin 4 of the operational amplifier U1 is connected with VCC; a pin 11 of the operational amplifier U1 is connected with VEE; the pin 6 of the operational amplifier U1 is connected with a pin 7 of the operational amplifier U1 by a capacitor C2; the pin 7 of the operational amplifier U1 outputs y, is connected with a pin 13 of the operational amplifier U1 by a resistor R1, is connected with a pin 6 of the operational amplifier U2 by a resistor R13 and is connected with a pin 3 of the multiplier U4: a pin 8 of the operational amplifier U1 outputs x, is connected with a pin 9 of the operational amplifier U1 by a capacitor C1, is connected with a pin 1 of the multiplier U3, is connected with a pin I of the multiplier U4 and is connected with the pin 9 of the operational amplifier U1 by a resistor R4; a pin 13 of the operational amplifier U1 is connected with a pin 14 of the operational amplifier U1 by a resistor R2; and the pin 14 of the operational amplifier U1 is connected with the pin 9 of the operational amplifier U1 by a resistor R3;

A pin 1 and a pin 2 of the operational amplifier U2 are hung in the air; a pin 3, a pin 5, a pin 10 and a pin 12 of the operational amplifier U2 are grounded; a pin 4 of the operational amplifier U2 is connected with VCC; a pin 11 is connected with VEE; the pin 6 of the operational amplifier U2 is connected with a pin 7 of the operational amplifier U2 by a capacitor C4; the pin 7 of the operational amplifier U2 outputs w and is connected with the pin 2 of the operational amplifier U1 by a resistor R5; a pin 8 of the operational amplifier U2 outputs z and is connected with a pin 3 of the multiplier U3: a pin 9 of the operational amplifier U2 is connected with the pin 8 of the operational amplifier U2 by a capacitor C3 and is grounded after being connected with the 8V DC power supply by the resistor R12; a pin 13 of the operational amplifier U2 is connected with a pin 14 of the operational amplifier U2 by a resistor R10; and the pin 14 of the operational amplifier U2 is connected with the pin 9 of the operational amplifier U2 by a resistor R11;

The pin 1 of the multiplier U3 is connected with the pin 8 of the operational amplifier U1; the pin 3 of the multiplier U3 is connected with the pin 8 of the operational amplifier U2; a pin 2, a pin 4 arid a pin 6 of the multiplier U3 are grounded; a pin 5 of the multiplier U3 is connected with VEE; a pin 7 of the multiplier U3 is connected with the pin 6 of the operational amplifier U1 by a resistor R8; and a pin 8 of the multiplier U3 is connected with VCC;

The pin 1 of the multiplier U4 is connected with the pin 8 of the operational amplifier U1; the pin 3 of the multiplier U4 is connected with the pin 7 of the operational amplifier U1; a pin 2 a pin 4 and a pin 6 of the multiplier U4 are grounded; a pin 5 of the multiplier U4 is connected with VEE; a pin 7 of the multiplier U4 is connected with the pin 13 of the operational amplifier U2 by a resistor R9; and a pin 8 of the multiplier U4 is connected with VCC.

2. An analog circuit of the four-dimensional non-equilibrium hyperchaotic system based on the five simplest systems is characterized by consisting of the operational amplifier U1, the operational amplifier U2, the multiplier U3, the multiplier U4 and the 8V DC power supply;

The operational amplifier U1 is connected with the operational amplifier U2 and the multiplier U3; the operational amplifier U2 is connected with the multiplier U4, the DC power supply and the operational amplifier U1; the multiplier U3 is connected with the operational amplifier U1; the multiplier U4 is connected with the operational amplifier U2; the 8V DC power supply is connected with the operational amplifier U2; LF347N is adopted as the operational amplifier U1 and the operational amplifier U2; and AD633JN is adopted as the multipliers U3 and U4;

The pin 1 of the operational amplifier U1 is connected with the pin 2 of the operational amplifier U1 by the resistor R6 and is connected with the pin 6 of the operational amplifier U1 by the resistor R7; the pin 3, the pin 5, the pin 10 and the pin 12 of the operational amplifier U1 are grounded; the pin 4 of the operational amplifier U1 is connected with VCC; the pin 11 of the operational amplifier U1 is connected with VEE; the pin 6 of the operational amplifier U1 is connected with the pin 7 of the operational amplifier U1 by the, capacitor C2: the pin 7 of the operational amplifier U1 outputs y, is connected with the pin 13 of the operational amplifier U1 by the resistor R1, is connected with the pin 6 of the operational amplifier U2 by the resistor R13 and is connected with the pin 3 of the multiplier U4; the pin 8 of the operational amplifier U1 outputs x, is connected with the pin 9 of the operational amplifier U1 by the capacitor C1, is connected with the pin 1 of the multiplier U3, is connected with the pin 1 of the multiplier U4 and is connected with the pin 9 of the operational amplifier U1 by the resistor R4; the pin 13 of the operational amplifier U1 is connected with the pin 14 of the operational amplifier U1 by the resistor R2; and the pin 14 of the operational amplifier U1 is connected with the pin 9 of the operational amplifier U1 by the resistor R3;

The pin 1 and the pin 2 of the operational amplifier U2 are hung in the air; the pin 3, the pin 5, the pin 10 and the pin 12 of the operational amplifier U2 are grounded; the pin 4 of the operational amplifier U2 is connected with VCC; the pin 11 is connected with VEE; the pin 6 of the operational amplifier U2 is connected with the pin 7 of the operational amplifier U2 by the capacitor C4; the pin 7 of the operational amplifier U2 outputs w and is connected with the pin 2 of the operational amplifier U1 by the resistor R5; the pin 8 of the operational amplifier U2 outputs z and is connected with the pin 3 of the multiplier U3; the pin 9 of the operational amplifier U2 is connected with the pin 8 of the operational amplifier U2 by the capacitor C3 and is grounded after being connected with the 8V DC power supply by the resistor R12; the pin 13 of the operational amplifier U2 is connected with the pin 14 of the operational amplifier U2 by the resistor R10; and the pin 14 of the operational amplifier U2 is connected with the pin 9 of the operational amplifier U2 by the resistor R11;

The pin 1 of the multiplier U3 is connected with the pin 8 of the operational amplifier U1; the pin 3 of the multiplier U3 is connected with the pin 8 of the operational amplifier U2; the pin 2, the pin 4 and the pin 6 of the multiplier U3 are grounded; the pin 5 of the multiplier U3 is connected with VEE; the pin 7 of the multiplier U3 is connected with the pin 6 of the operational amplifier U1 by the resistor R8; and the pin 8 of the multiplier U3 is connected with VCC;

The pin 1 of the multiplier U4 is connected with the pin 8 of the operational amplifier U1; the pin 3 of the multiplier U4 is connected with the pin 7 of the operational amplifier U1: the pin 2, the pin 4 and the pin 6 of the multiplier U4 are grounded; the pin 5 of the multiplier U4 is connected with VEE; the pin 7 of the multiplier U4 is connected with the pin 13 of the operational amplifier U2 by the resistor R9; and the pin 8 of the multiplier U4 is connected with VCC.

In the circuit, R1=R2=R3=R4=R6=R7=R10=R11=R13=10 kΩ, R8=R9=1 kΩ, R5=R12=100 kΩ, and C1=C2=C3=C4=10 nF.

Of course, the above descriptions are not intended to limit the present invention, The, present invention is also not limited to the above example. Any change, modification, addition or replacement made by those ordinary skilled in the art within the substantial scope of the present invention also belongs to the protection scope of the present invention.

I claim:

1. An analog circuit of a four-dimensional non-equilibrium hyperchaotic system based on five simplest systems, comprising a first multiplier, a second multiplier, a plurality of inverting adders, a plurality of inverting integrators and an 8V DC power supply, wherein each of the plurality of inverting adders is formed by a first operational amplifier or a second operational amplifier and two resistors; each of the plurality of inverting integrators is formed by the first operational amplifier or the second operational amplifier, a capacitor and one or more resistors; the first multiplier and the second multiplier are used for realizing multiplication operations; the 8V DC power supply is used for realizing constant input;

the first operational amplifier is connected with the second operational amplifier and the first multiplier; the second operational amplifier is connected with the second multiplier, the DC power supply and the first operational amplifier; the second multiplier is connected with the second operational amplifier and the first operational amplifier; LF347N is adopted as the first operational amplifier and the second operational amplifier; and AD633JN is adopted as the first multiplier and the second multiplier;

a pin 1 of the first operational amplifier is connected with a pin 2 of the first operational amplifier by a resistor R6 and is connected with a pin 6 of the first operational amplifier by a resistor R7; a pin 3, a pin 5, a pin 10 and a pin 12 of the first operational amplifier are grounded; a pin 4 of the first operational amplifier is connected with VCC; a pin 11 of the first operational amplifier is connected with VEE; the pin 6 of the first operational amplifier is connected with a pin 7 of the first operational amplifier by a capacitor C2; the pin 7 of the first operational amplifier outputs y, is connected with a pin 13 of the first operational amplifier by a resistor R1, is connected with a pin 6 of the second operational amplifier by a resistor R13 and is connected with a pin 3 of the second multiplier: a pin 8 of the first operational amplifier outputs x, is connected with a pin 9 of the first operational amplifier by a capacitor C1, is connected with a pin 1 of the first multiplier, is connected with a pin 1 of the second multiplier and is connected with the pin 9 of the first operational amplifier by a resistor R4; a pin 13 of the first operational amplifier is connected with a pin 14 of the first operational amplifier by a resistor R2; and a pin 14 of the first operational amplifier is connected with the pin 9 of the first operational amplifier by a resistor R3;

a pin 1 and a pin 2 of the second operational amplifier are hung in the air; a pin 3, a pin 5, a pin 10 and a pin 12 of the second operational amplifier are grounded; a pin 4 of the second operational amplifier is connected with VCC; a pin 11 is connected with VEE; the pin 6 of the second operational amplifier is connected with a pin 7 of the second operational amplifier by a capacitor C4; the pin 7 of the second operational amplifier outputs w and is connected with the pin 2 of the first operational amplifier by a resistor R5; a pin 8 of the second operational amplifier outputs z and is connected with a pin 3 of the first multiplier; a pin 9 of the second operational amplifier is connected with the pin 8 of the second operational amplifier by a capacitor C3 and is grounded after being connected with the 8V DC power supply by a resistor R12; a pin 13 of the second operational amplifier is connected with a pin 14 of the second operational amplifier by a resistor R10; and the pin 14 of the second operational amplifier is connected with the pin 9 of the second operational amplifier by a resistor R11;

the pin 1 of the first multiplier is connected with the pin 8 of the first operational amplifier; the pin 3 of the first multiplier is connected with the pin 8 of the second operational amplifier; a pin 2, a pin 4 and a pin of the first multiplier are grounded; a pin 5 of the first multiplier is connected with VEE; a pin 7 of the first multiplier is connected with the pin 6 of the first operational amplifier by a resistor R8; and a pin 8 of the first multiplier is connected with VCC;

the pin 1 of the second multiplier is connected with the pin 8 of the first operational amplifier; the pin 3 of the second multiplier is connected with the pin 7 of the first operational amplifier; a pin 2, a pin 4 and a pin 6 of the second multiplier are grounded; a pin 5 of the second multiplier is connected with VEE; a pin 7 of the second multiplier is connected with the pin 13 of the operational amplifier U2 by a resistor R9; and a pin 8 of the second multiplier is connected with VCC.

* * * * *